US006633858B2

(12) United States Patent
Yamakawa et al.

(10) Patent No.: US 6,633,858 B2
(45) Date of Patent: Oct. 14, 2003

(54) PROBLEM SOLVER USES LEARNING A COGNITIVE DISTANCE TO ATTAIN A GOAL STATE

(75) Inventors: Hiroshi Yamakawa, Kawasaki (JP); Hiroyuki Okada, Kawasaki (JP); Takayuki Baba, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 363 days.

(21) Appl. No.: 09/813,027

(22) Filed: Mar. 21, 2001

(65) Prior Publication Data

US 2002/0062156 A1 May 23, 2002

(30) Foreign Application Priority Data

Nov. 20, 2000 (JP) .......................... 2000-352343

(51) Int. Cl.⁷ .......................... G06F 15/18; G05B 19/04
(52) U.S. Cl. .......................... 706/16; 706/25; 700/254
(58) Field of Search ...................... 706/16, 25; 700/254

(56) References Cited

PUBLICATIONS

Luiz M. G. Goncalves, "Neural Mechanisms for Learning of Attention Control and Pattern Categorization as Basis for Robot Cognition", IEEE proceedings of the International Conference on Intelligent Robots and Systems, 2000.*

Leslie Pack Kaelbling, et al., "Reinforcement Learning: A Survey", Journal of Artificial Intelligence Research May 4, 1996, pp. 237–285.

Stuart J. Russell, et al., "Artificial Intelligence A Modern Approach", Prentice–Hall International, Inc., 1995, 3 Solving Problems by Searching pp. 55–85; 11 Planning, pp. 337–363.

* cited by examiner

Primary Examiner—George B. Davis
(74) Attorney, Agent, or Firm—Staas & Halsey LLP

(57) ABSTRACT

A problem solver for generating an action sequence executed from an initial state to a goal state in a state space defined by a particular problem is disclosed, that comprises a cognitive distance learning unit learning a cognitive distance that represents a cost acted on the environment of the state space, the cost being spent in an action sequence executed from a first state in the state space to a second state that is different from the first state, and a next action deciding unit deciding a next action contained in the action sequence that has to be executed in a particular state to attain the goal state in the state space based on the cognitive distance learnt by the cognitive distance learning unit.

13 Claims, 20 Drawing Sheets

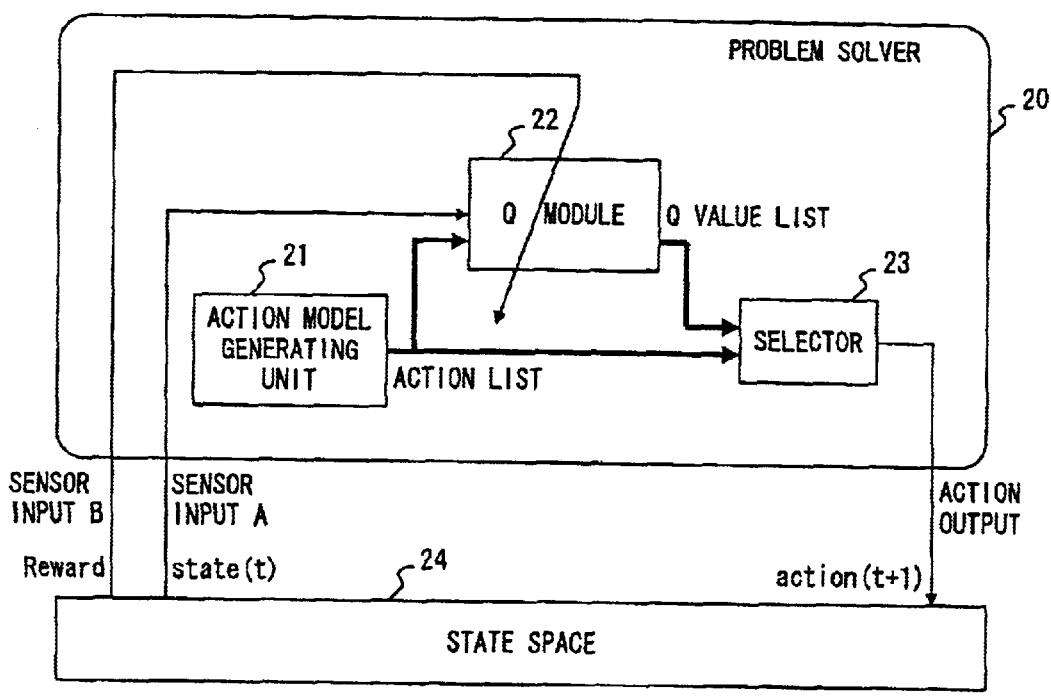
F I G. 6A

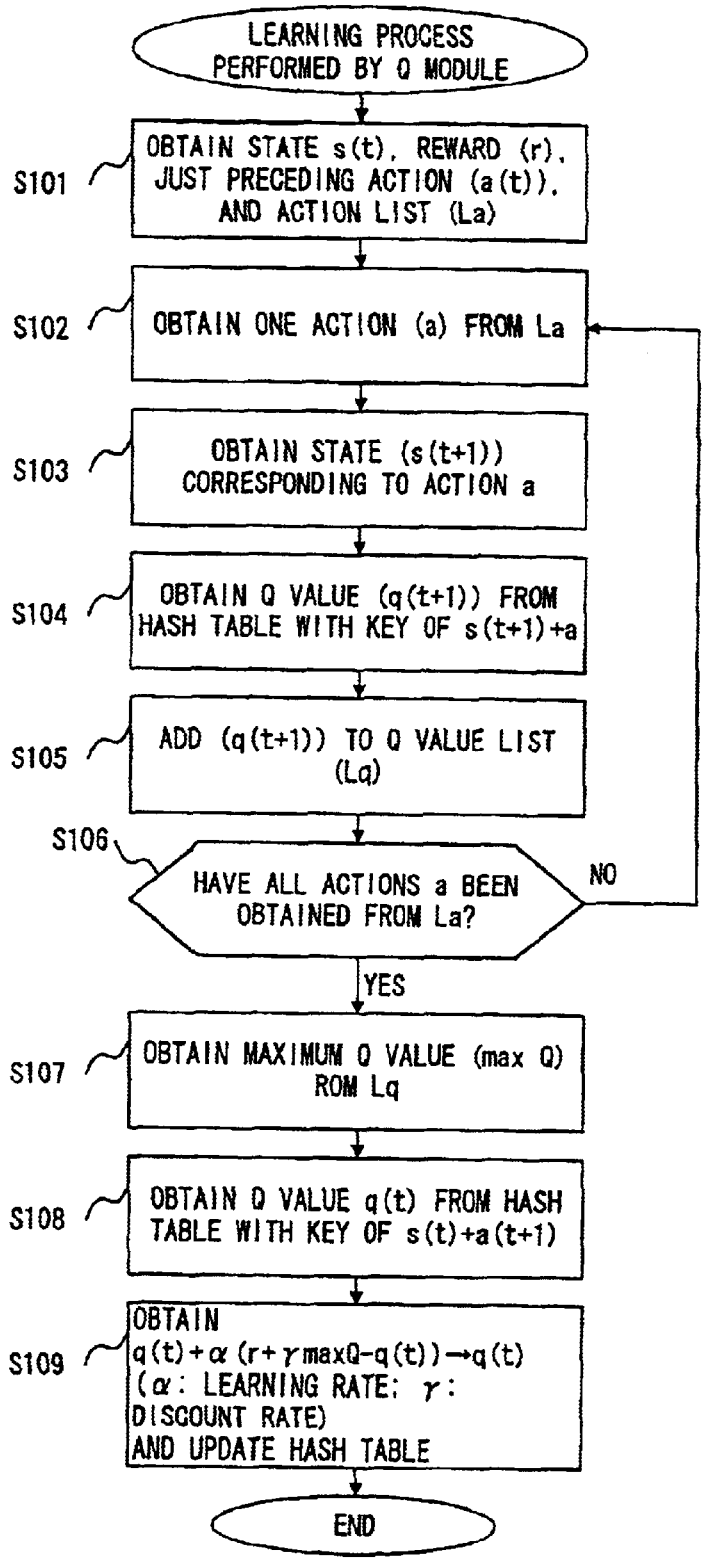
F I G. 8

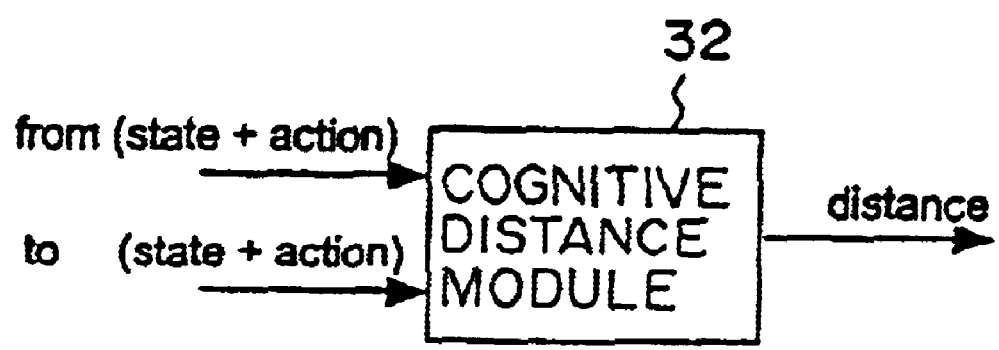
F I G. 10

| state(t) | action(t) |

FIG. 15

PROBLEM SOLVER USES LEARNING A COGNITIVE DISTANCE TO ATTAIN A GOAL STATE

BACKGROUND OF THE INVENTION

1. Field of the Invention

The present invention relates to a data processing apparatus, in particular, to a problem solver for inputting an initial state and a goal state in a state space defined by a particular problem and generating an action sequence executed from the initial state and the goal state.

2. Description of the Related Art

As a problem solver for inputting an initial state and a goal state in a state space defined by a particular problem and generating an action sequence executed from the initial state and the goal state, a general problem solver (GPS) is well known.

As shown in FIG. 1, the GPS has a model for applying an action (t) to a particular state (t) (namely, performing the action (t) in the state (t)) and predicting the resultant state (t+1) (this model is referred to as world model or forward model).

When the GPS generates an action sequence, the GPS obtains the difference between an initial state and a goal state from a state space defined by a problem. In addition, the GPS selects an action (operator) so that the difference becomes small.

Thereafter, as the next sub goal, the GPS applies the selected action so that application conditions of the action is satisfied. Thereafter, the GPS repeatedly detects the difference between a current state and a goal state and selects an appropriate action. As a result, when there is no difference, the GPS obtains an action sequence (namely, a plan) executed from the initial state to the goal state. Finally, the GPS executes the plan.

When an action sequence is generated using such a model (this process is also referred to as classical planning), the number of calculations becomes large (in other words, the calculation cost becomes high).

In addition, an immediate action deciding method (referred to as reactive planning method) is known. As shown in FIG. 2, the reactive planning method can be applied to a system that requires a real time operation in such a manner that an action(t) (abbreviated as a(t)) is directly obtained in a particular state(t) (abbreviated as s(t)). In this method, although the calculation cost for executing an action is low, an action cannot be changed as a goal state is changed. In other words, this method does not have flexibility.

As a technology for solving such a problem, a goal state is represented as a reward (or an effect). By predictively evaluating the middle of an action sequence, an action that is executed is changed corresponding to the learnt result. This technology is referred to as a reinforcement learning method.

As a typical algorithm of the reinforcement learning method, Q-learning method is known. In the Q-learning method, the mapping from a state s(t) to an action a(t+1) is changed corresponding to a reward obtained from the outside. As shown in FIG. 3, in the Q-learning method, a Q value Q(s(t)+a(t)) as a predictive reward corresponding to an action a(t+1) in a state s(t) is predicted by a Q module. An action a(t+1) is selected so that the Q value (predictive reward) becomes large. As a result, an action can be reasonably selected.

An actor-critic model is another famous model of the reinforcement learning method. In the actor-critic model, a V value value (s(t)) is predicted as a predictive reward corresponding to a state s(t) by a critic module. Corresponding to an error of the obtained predictive reward, the selective probability of an action that is executed is changed by an actor module.

Thus, in any reinforcement learning model, an action that is executed can be quickly decided.

For details about the planning method, refer to "Artificial Intelligence, Modern Approach", Russel, S. J. & Norvig, P., Prentice-Hall International, Inc. For details about the reinforcement learning method, refer to "Reinforcement Learning, A Survey", Kaelbling, L. P., Littman, M. L., & Moore, A. W., J. Artificial Intelligence Research, Vol. 4, pp 237–285 (1996).

As described above, the artificial planning method has a problem about high cost in calculations for executing an action.

Although the reactive planning method allows the calculation cost in executing an action to be more reduced than the classical planning method, an action cannot be changed as a goal state is changed. Thus, the reactive planning method does not have flexibility.

In addition, the reinforcement learning method allows an action to be changed as a goal state is changed. However, when the goal state is changed, the learnt results cannot be basically used. Thus, the learning process should be repeated. However, since the learning amount (cost) necessary for a predetermined goal state is large. As a result, the change of the goal state is restricted. Thus, the flexibility of the reinforcement learning method is low.

SUMMARY OF THE INVENTION

The present invention is made from the above-described point of view. An object of the present invention is to provide a problem solver that allows the calculation cost in executing an action to be reduced and the flexibility against a change of a goal state to be improved.

The present invention is a problem solver for generating an action sequence executed from an initial state to a goal state in a state space defined by a particular problem.

The problem solver of a first aspect of the present invention comprises a cognitive distance learning unit learning a cognitive distance that represents a cost acted on the environment of the state space, the cost being spent in an action sequence executed from a first state in the state space to a second state that is different from the first state and a next action deciding unit deciding a next action contained in the action sequence that has to be executed in a particular state to attain the goal state in the state space based on the cognitive distance learnt by the cognitive distance learning unit.

The problem solver of a second aspect of the present invention comprises a cognitive distance learning unit learning a cognitive distance that represents a cost acted on the environment of the state space, the cost being spent in an action sequence executed from a first state in the state space to a second state that is different from the first state and a next state deciding unit deciding a next state reachable in the execution of a particular action contained in the action sequence based on the cognitive distance learnt by the cognitive distance learning unit, the particular action having to be executed in a particular state to attain the goal state in the state space.

Since the present invention has the structures of the first and second aspects, the cognitive distance learning unit learns a cognitive distance from any state and a goal state in a state space. Based on the learnt result of the cognitive distance, the cognitive distance learning unit generates a action sequence. Unlike with the predictive evaluation of the reinforcement learning method, when a goal state is changed while the cognitive distance is being learnt, the changed goal state is immediately reflected to the learnt result. The next action deciding unit can decide the next action by simply comparing cognitive distances as the learnt result of the cognitive distance learning unit. The next state deciding unit can decide the next state by simply comparing cognitive distances as the learnt result of the cognitive distance learning unit. Thus, the calculation cost for executing an action can be suppressed. In addition, the flexibility against a changed goal state can be secured.

BRIEF DESCRIPTION OF DRAWINGS

The present invention will be more apparent from the following detailed description when the accompanying drawings are referenced.

FIG. 6A is a schematic diagram showing the structure of a problem solver using the Q-learning method;

FIG. 8 is a flow chart showing a learning process performed by a Q module;

FIG. 10 is a schematic diagram for explaining and input and an output of a cognitive distance module;

FIG. 15 is a schematic diagram showing vector elements handled by the problem solver shown in FIG. 14;

DESCRIPTION OF PREFERRED EMBODIMENT

Figure 4A:
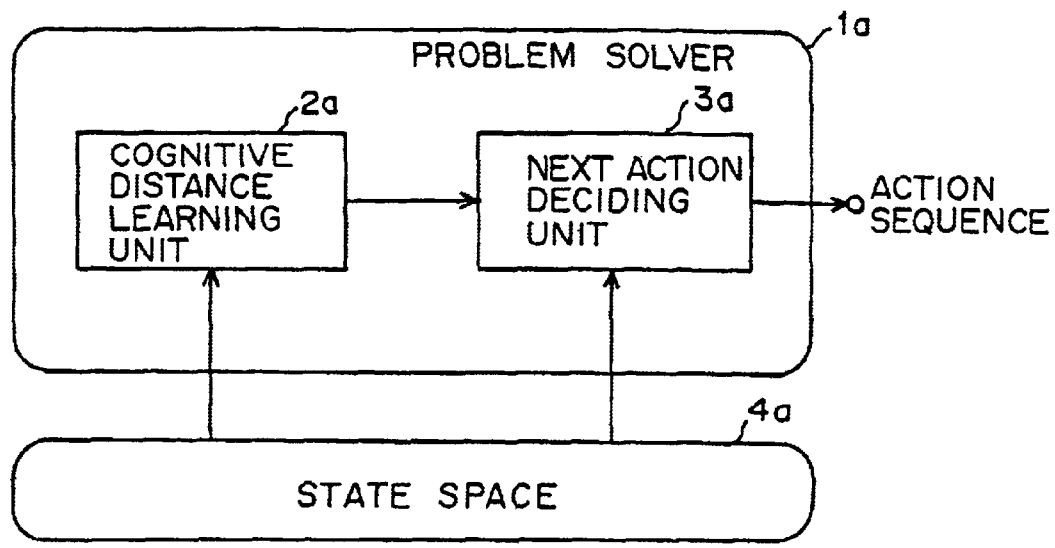
FIG. 4A is a schematic diagram showing the theoretical structure of a first example of a problem solver according to the present invention.
Figure 4B:
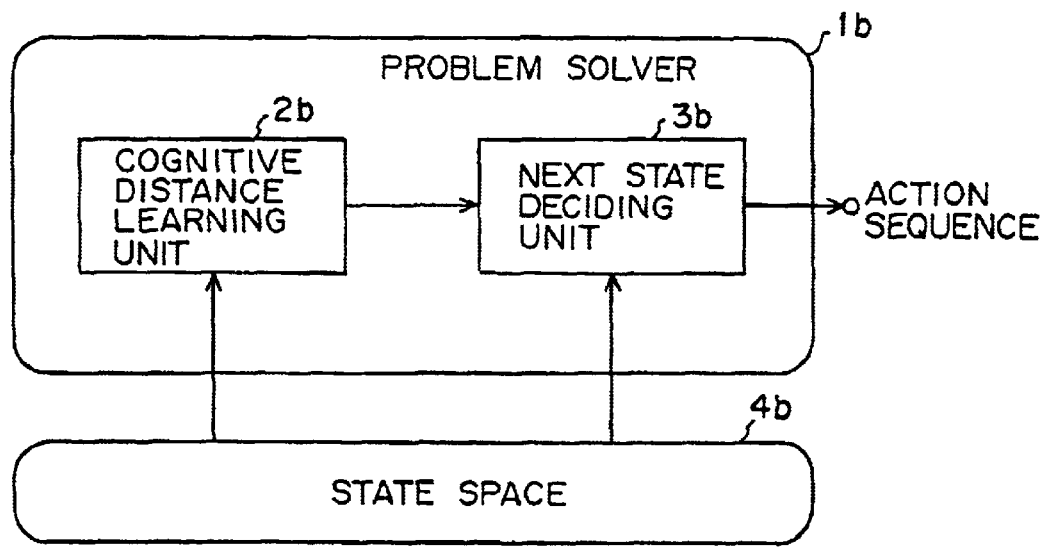
FIG. 4B is a schematic diagram showing the theoretical structure of a second example of a problem solver according to the present invention.

FIGS. 4A and 4B are schematic diagrams showing the theoretical structures of the present invention. FIG. 4A shows the structure of a problem solver of a first example of the present invention. FIG. 4B shows the structure of a problem solver of a second example of the present invention.

The problem solver ($1a$, $1b$) (shown in FIGS. 4A and 4B) according to the present invention generates an action sequence executed from an initial state to a goal state in a state space ($4a$, $4b$) defined by a particular problem.

The cognitive distance learning unit ($2a$, $2b$) (shown in FIGS. 4A and 4B) learns a cognitive distance that represents a cost acted on the environment of the state space ($4a$, $4b$), the cost being spent in an action sequence executed from any state in the state space ($4a$, $4b$) to the goal state. The cognitive distance is a value obtained corresponding to any two states in the state space ($4a$, $4b$). An example of the cognitive distance is a value representing the physical distance between two states. However, it should be noted that the present invention is not limited to such an example.

The next action deciding unit $3a$ (shown in FIG. 4A) decides a next action contained in the action sequence that has to be executed in a particular state to attain the goal state in the state space $4a$ based on the cognitive distance learnt by the cognitive distance learning unit $2a$.

To decide the next action, for example, the problem solver $1a$ further comprises an action presenting unit that presents next actions that are executable in any state of the state space $4a$, and the next action deciding unit $3a$ preferably selects one from the next actions presented by the action presenting unit so that the cognitive distance from a state reached as the result of the execution of the selected action to the goal state becomes short.

The next state deciding unit $3b$ (shown in FIG. 4B) decides a next state reachable in the execution of a particular action contained in the action sequence based on the cognitive distance learnt by the cognitive distance learning unit $2b$, the particular action having to be executed in a particular state to attain the goal state in the state space $4b$.

To decide the next state, for example, the problem solver $1b$ further comprises a state presenting unit that presents states reachable in the execution of next actions that are executable in any state of the state space $4b$, and the next state deciding unit $3b$ preferably selects one from the next states presented by the state presenting unit so that the cognitive distance to the goal state becomes short.

Since the present invention has structures as shown in FIGS. 4A and 4B, the cognitive distance learning unit ($2a$, $2b$) learns a cognitive distance from any state and a goal state in a state space ($4a$, $4b$). Based on the learnt result of the cognitive distance, the cognitive distance learning unit generates a action sequence. Unlike with the predictive evaluation of the reinforcement learning method, when a goal state is changed while the cognitive distance is being learnt, the changed goal state is immediately reflected to the learnt result. The next action deciding unit $3a$ can decide the next action by simply comparing cognitive distances as the learnt result of the cognitive distance learning unit 2a. The next state deciding unit 3b can decide the next state by simply comparing cognitive distances as the learnt result of the cognitive distance learning unit 2b. Thus, the calculation cost for executing an action can be suppressed. In addition, the flexibility against a changed goal state can be secured.

In the structure shown in FIG. 4A (or FIG. 4B), the cognitive distance learning unit 2a (or 2b) may store the cognitive distance as the learnt result. Then, the next action deciding unit 3a (or next state deciding unit 3b) decides the next action (or the next state) corresponding to the cognitive distance learnt by and stored in the cognitive distance learning unit 2a (or 2b), and the cognitive distance learning unit 2a (or 2b) updates a stored cognitive distance when the cognitive distance learning unit has re-learnt it. According to the structure, an experience of the execution of an action can be reflected to the learnt result. Thus, the flexibility against a changed goal state can be further improved.

In the structure shown in FIG. 4B, the problem solver 1b may further comprise a segmentation unit correlating a range of a state in the state space 4b, the cognitive distance of the state being learnable by the cognitive distance learning unit 2b, with one state on an upper hierarchical layer in the state space 4b, a landmark correlating unit correlating a state on the upper hierarchical layer in the state space 4b with a landmark on a lower hierarchical layer in the state space 4b, the landmark being a state representing the range on the lower hierarchical layer, an upper hierarchical layer cognitive distance learning unit learning the cognitive distance from a first state to a second state that is different from the first state on the upper hierarchical layer, and an upper hierarchical layer next state deciding unit deciding a next state reachable in the execution of a particular action having to be executed in a particular state on the upper hierarchical layer in the state space 4b, the next state being to attain a goal state on the upper hierarchical layer in the state space 4b, based on the cognitive distance on the upper hierarchical layer in the state space 4b, the cognitive distance being learnt by the upper hierarchical layer cognitive distance learning unit, the particular state on the lower hierarchical layer being correlated with the particular state on the upper hierarchical layer by the segmentation unit. In the structure, the cognitive distance learning unit 2b learns the cognitive distance on the lower hierarchical layer in the state space 4b. The next state deciding unit 3b decides a next state reachable in the execution of a next action that has to be executed in a particular state on the lower hierarchical layer in the state space 4b, the next state being to attain a landmark correlated with a next state on the upper hierarchical layer in the state space 4b by the landmark correlating unit, based on the cognitive distance on the lower hierarchical layer in the state space 4b, the cognitive distance being learnt by the cognitive distance learning unit 2b.

In the structure, while the stored data amount of learnt results for cognitive distances is limited, an action between states that are far apart can be decided.

When a computer reads and executes a control program that directs the computer to control functions of individual structural units of the problem solver (1a, 1b) from a computer-readable storage medium, the above-described problem can be solved.

Next, with reference to the accompanying drawings, an embodiment of the present invention will be described. In the embodiment, the case of which a problem shown in FIG. 5 is solved by a problem solver according to the present invention will be described.

Figure 5:
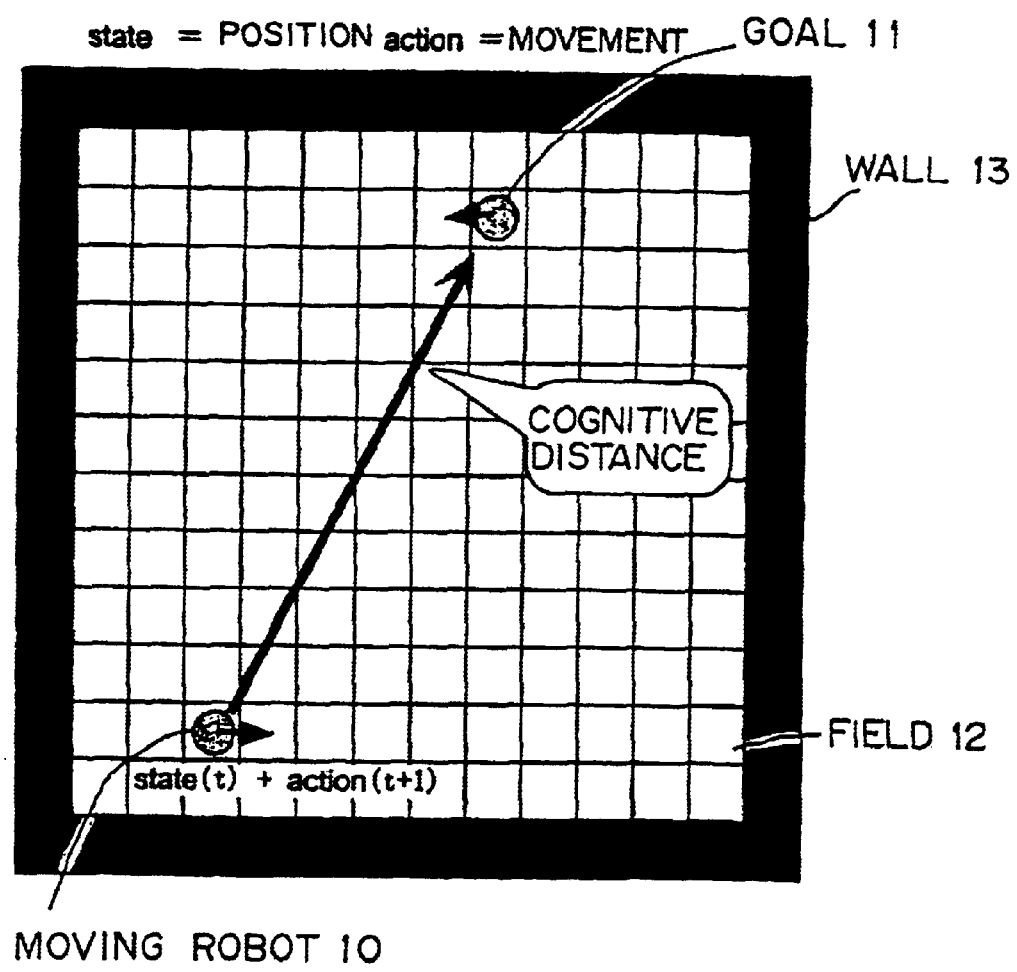
FIG. 5 is a schematic diagram for explaining an example of a problem solved by a problem solver according to the present invention.

The problem shown in FIG. 5 is a navigation task for a moving robot. In the problem, a route through which a moving robot 10 arrives at a goal 11 is obtained. In this example, the moving robot 10 can obtain information that represents at what grid in a field 12 it is currently positioned (the information is for example two-dimensional coordinate information). In addition, the moving robot 10 can move on the grids in the field 12 upwards, downwards, leftwards, and rightwards one grid at a time. When the moving robot 10 is on a wall 13 that surrounds the four directions of the field 12, it cannot move.

Figure 6B:
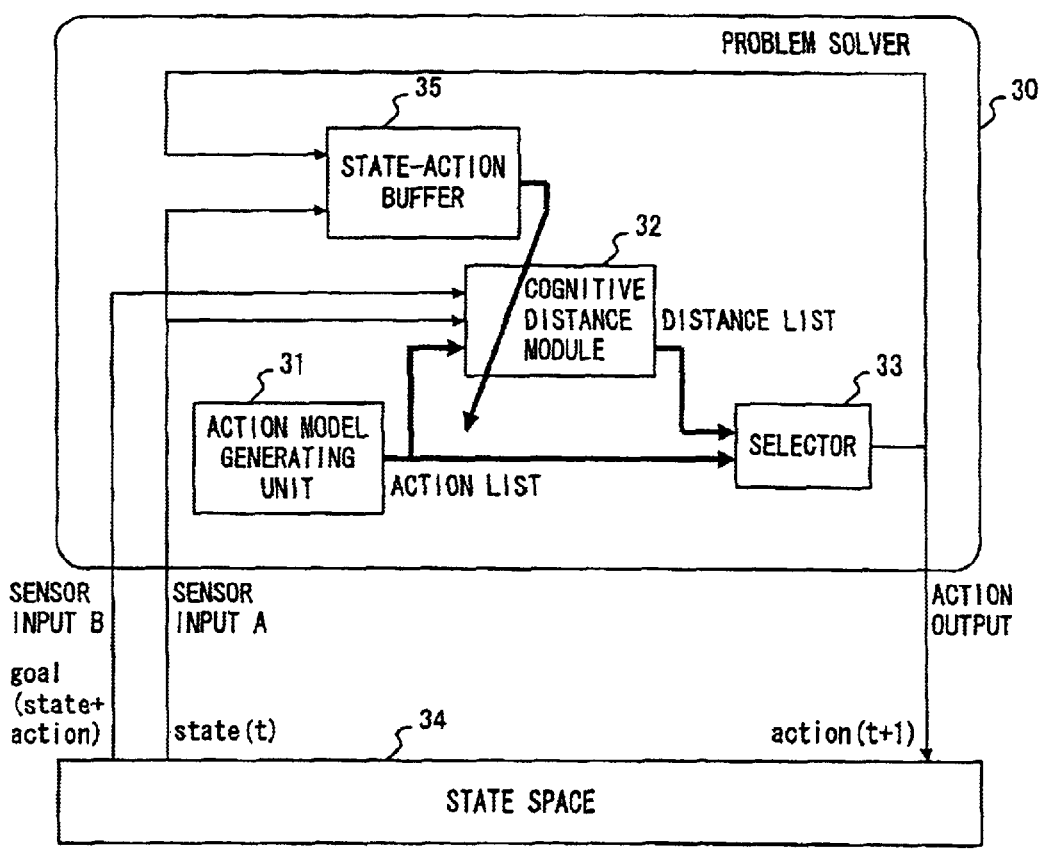
FIG. 6B is a schematic diagram showing the structure of a problem solver based on a cognitive distance.
Figure 7:
FIG. 7 is a schematic diagram showing vector elements handled by the problem solver shown in FIGS. 6A and 6B.

FIGS. 6A and 6B are schematic diagrams for explaining the difference between a problem solver using the Q-learning method and a problem solver based on a cognitive distance according to the present invention. In those structures shown in FIGS. 6A and 6B, a vector composed of a current state s(t) and an action a(t+1) executed in the state (see FIG. 7) is handled.

Next, with reference to FIG. 6A, the problem solver using the Q-learning method will be described.

Referring to FIG. 6A, a problem solver 20 comprises an action model generating unit 21, a Q module 22, and a selector 23. The problem solver 20 receives a reward from a state space 24 defined by a problem corresponding to a current state s(t) and an action a(t+1) executed in a current state s(t) as a learning process. The problem solver 20 repeats such a learning process and finally outputs the next action a(t+1) that is executed in the current state s(t).

The action model generating unit 21 generates and outputs a list of actions that can be executed in the current state s(t). This list is referred to as action list. In the problem shown in FIG. 5, the action model generating unit 21 generates a list of actions that can be executed at the current position of the moving robot 10 (movements for one grid in the field 12) and outputs the list as an action list.

The Q module 22 calculates a reward expected for an action a(t+1) that can be executed corresponding to a current state s(t) that is input from the state space 24 and a reward that is input from the state space 24 in the learning process.

In the example shown in FIG. 5, in the learning process, the moving robot 10 actually moves by one grid forwards, backwards, leftwards, and rightwards in the field 12. Only when the moving robot 10 arrives at the goal 11, the moving robot 10 can get a reward (in other words, in other states, the moving robot 10 cannot get a reward) The reward is referred to as immediate evaluation. The Q module 22 evaluates a reward expected for each moving action executed at each position in the field 12 corresponding to the reward, the just preceding position (state) in the field 12 of the moving robot 10, and the movement (action) executed at the just preceding position (the expected value for the reward is referred to as delayed evaluation) and outputs a list of rewards as a Q value list. The Q module 22 sufficiently performs the learning process so as to improve the accuracy of the estimation.

FIG. 8 is a flow chart showing the learning process performed by the Q module 22. Next, with reference to FIG. 8, the learning process will be described for the problem shown in FIG. 5. The learning process is performed whenever the moving robot 10 moves in the field 12.

A current state s(t) and a reward r in the state s(t) are obtained from the state space 24. In addition, the above-described action list La is obtained from the action model generating unit 21. Moreover, the just preceding action a(t) against the current state s(t) is obtained. In other words, the preceding output of the problem solver 20 is also obtained (at step S101).

Thereafter, one action a that can be executed in the current state s(t) is obtained from the action list La (at step S102). Thereafter, a state s(t+1) as a result of the execution of the action a is obtained (at step S103).

At that point, a Hash table stored in the Q module 22 is referenced. A Q value q(t+1) corresponding to a vector s(t+1)+a is obtained (at step S104) Although the initial values of the Q values of the Hash table are all zeros (nulls), the Q values are updated at a later step.

Thereafter, the obtained Q value q(t+1) is added to the Q value list Lq that is output information of the Q module 22 (at step S105).

Thereafter, it is determined whether or not all actions a contained in the action list La have been executed in the loop from step S103 to step S105 (at step S106). When the determined result at tep S106 is No, the flow returns to step S102. At step S102, the loop is repeated.

On the other hand, when the determined result at step S106 is Yes, the maximum value max Q of the Q values q(t+1) is obtained from the Q value list Lq (at step S107). In addition, the Q value q(t) corresponding to a vector s(t)+a (t+1) is obtained from the Hash table (at step S108).

Corresponding to the value obtained at step S108, the Q value q(t) in the Hash table is updated corresponding to the following expression (at step S109).

$$q(t)+\alpha(r+\gamma \max Q-q(t)) \rightarrow q(t)$$

The above expression is a well-known update expression for a basic Q value in the Q-learning method. In the above expression, $\gamma$ ($0 \leq \gamma < 1$) is referred to as discount rate and used to evaluate a future reward obtained in the next state of a particular state as a discount reward in the current state. On the other hand, $\alpha$ ($0 < \alpha \leq 1$) is referred to as learning rate and used to decide how much the result of one trial is affected to a learnt result.

The Q module 22 performs the above-described process as the learning process.

Figure 9:
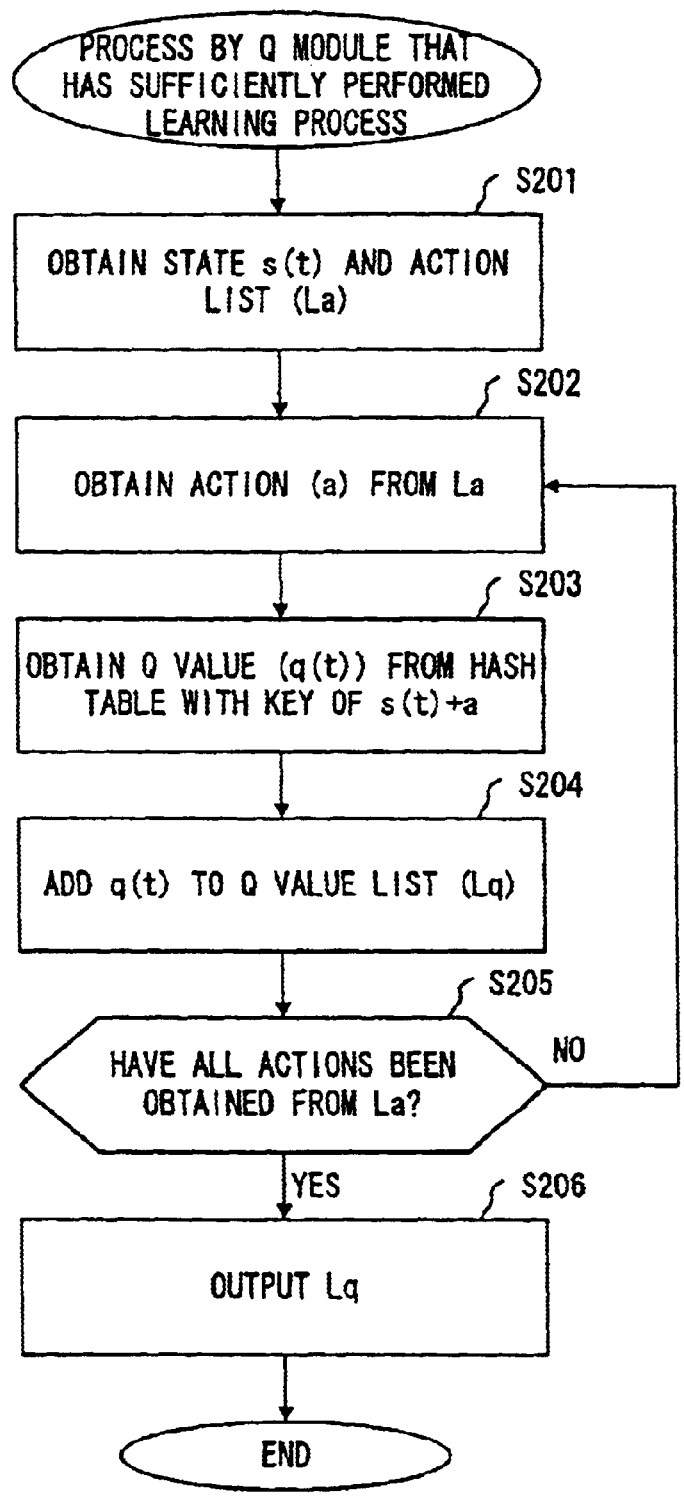
FIG. 9 is a flow chart showing a process performed by the Q module that has sufficiently performed the learning process.

FIG. 9 is a flow chart showing a process performed by the Q module 22 that has sufficiently performed the learning process.

First of all, a current state s(t) is obtained from the state space 24. In addition, the above-described action list La is obtained from the action model generating unit 21 (at step S201).

Thereafter, one action that can be executed in the current state s(t) is obtained from the action list La (at step S202).

Thereafter, a Q value q(t) is obtained from the Hash table stored in the Q module 22 with a key of a vector s(t)+a (at step S203).

Thereafter, the Q value q(t) obtained at step S203 is added to the above-described Q value list Lq that is output information of the Q module 22 (at step S204).

Thereafter, it is determined whether or not the loop from step S203 to step S204 has been performed for all actions a contained in the action list La (at step S205). When the determined result at step S205 is No, the flow returns to step S202. At step S202, the loop is repeated.

On the other hand, when the determined result at step S205 is Yes, the Q value list Lq is output to the selector 23 (at step S206). Thereafter, the process is completed.

As described above, after the Q module 22 has sufficiently performed the leaning process, it can immediately generate a Q value list Lq corresponding to the current state s(t).

Next, returning to FIG. 6A, the operation of the problem solver 20 will be further described.

The selector 23 selects an action from the action list that is output from the action model generating unit 21 based on the Q value list generated by the Q module 22 which has sufficiently performed the learning process so that the highest reward (the highest delay evaluation) can be obtained and outputs the selected result as an action a(t+1). In the problem shown in FIG. 5, one grid is selected so that the moving robot 10 most approaches the goal 11. As a result, an instruction that causes the moving robot 10 to move to the selected grid is output.

The individual structural units of the problem solver 20 are operated in such a manner. As a result, a Q value of a particular state and an action executed in the state is learnt. Thus, corresponding to the learnt result, an adequate action is quickly selected. However, in the problem shown in FIG. 5, since there is a dependency between the obtained reward and the position of the goal 11, when the goal 11 is moved, the learnt results of obtained Q values cannot be reused. Thus, Q values should be re-learnt.

Next, with reference to FIG. 6B, a problem solver based on a cognitive distance according to the present invention will be described.

Referring to FIG. 6B, in a problem solver 30, the Q module 22 disposed in the problem solver 20 used in the Q-learning method shown in FIG. 6A is substituted with a cognitive distance module 32. In addition, the problem solver 30 also comprises a state-action buffer 35. The problem solver 30 repeats a trial for obtaining a vector of a current state s(t) and a goal state "goal(state+action)" from a state space 34 defined by a problem. As the problem solver 30 sufficiently repeats the trial, it can quickly output the next adequate action a(t+1) corresponding to inputs of a current state s(t) and a goal state vector goal(state+action).

As with the action model generating unit 21 shown in FIG. 6A, an action model generating unit 31 generates a list of actions that can be executed in a current state s(t) and outputs the generated list as an action list.

The cognitive distance module 32 inputs a "from(state+action)" vector as a start position and a "to(state+action)" vector as a goal position and outputs the distance necessary for moving from the from vector to the to vector. This distance is referred to as cognitive distance.

In FIG. 6B, the cognitive distance module 32 calculates the distance (cognitive distance) necessary for moving from a vector of a state s(t) and an action a(t+1) that can be executed in the state s(t) to a vector that represents a goal state corresponding to a current state s(t) in the state space 34 that is input to a sensor A and a goal state goal(state+action) in the state space 34 that is input to a sensor B and outputs the result as a distance list. In addition, the cognitive distance module 32 stores the calculated distance value to the table.

In the problem shown in FIG. 5, the cognitive distance module 32 generates a distance list that represents the relation between the movement that can be executed at the current position of the moving robot 10 in the field 12 and the cognitive distance (the number of grids necessary for the movement) between the moving robot 10 and the goal 11 corresponding to the current position of the moving robot 10 in the field 12, the position of the goal 11, and the action of the moving robot 10 and outputs the generated distance list.

A selector 33 selects an action from the action list that is output from the action model generating unit 31 corresponding to the distance list that is output from the cognitive distance module 32 so that the cognitive distance becomes the shortest and outputs the selected result as an action a(t+1). In the problem shown in FIG. 5, one grid is selected so that the distance between the current position of the moving robot 10 in the field 12 and the goal 11 becomes the shortest. An instruction for causing the moving robot 10 to move to the selected grid is output.

Alternatively, the selector 33 may select an action so that the cognitive distance becomes shortest in such a manner that the cognitive distance correlates with the action selection probability.

The state-action buffer 35 is a buffer that stores past records of actions a(t+1) executed in states s(t). Thus, the state-action buffer 35 store each vector as a pair of a state s(t) and an action a(t+1) executed in the state s(t). The size of the state-action buffer 35 is limited. When the state-action buffer 35 becomes full, the oldest vector stored therein is substituted with a new vector.

When the state-action buffer 35 has stored a vector of a state as an object for obtaining the distance and an action that can be executed in the state in the state-action buffer 35, the cognitive distance module 32 references the distance table stored therein and compares the distance of the vector stored therein and the newly obtained distance. When the newly obtained distance is shorter than the distance stored in the table, the cognitive distance module 32 updates the distance table with the newly obtained distance. Since the distance table is updated, the learnt result corresponding to the past trial is corrected. Thus, even if a goal state is changed, the learnt result can be flexibly used.

Figure 11:
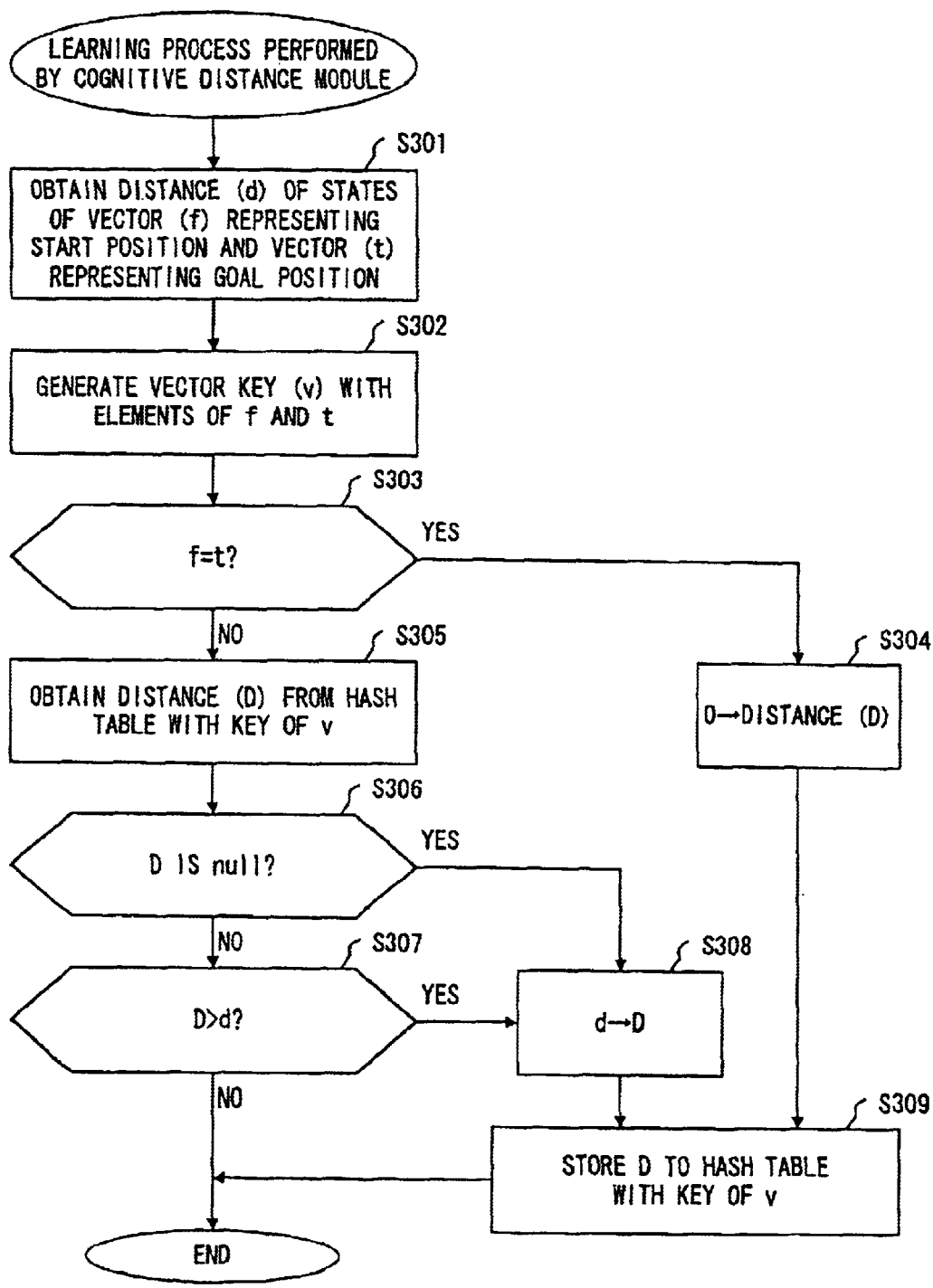
FIG. 11 is a flow chart showing a learning process performed by the cognitive distance module.

FIG. 11 is a flow chart showing a learning process performed by the cognitive distance module 32 having inputs and an output shown in FIG. 10. In the learning process, the distance between any two vectors that are the above-described from vector (abbreviated as f vector) and to vector (abbreviated as t vector) that designate a state and an action in a state space is learnt. The learning process is performed whenever an f vector or a t vector varies.

First of all, an f vector and a t vector are obtained. In addition, the distance d between the states represented by the f vector and the t vector are obtained corresponding the f vector and the t vector (at step S301).

With the f vector and the t vector, a vector key v that is Hash code is generated (at step S302).

Thereafter, it is determined whether or not the f vector matches the t vector (at step S303). When the determined result at step S303 is Yes, value "0" is substituted into a variable D for the distance (at step S304). Thereafter, the flow advances to step S309.

On the other hand, when the determined result at step S303 is No, a distance is obtained from the Hash table stored in the cognitive distance module 32 with a key of the vector key v and substituted into the variable D (at step S305).

Thereafter, it is determined whether or not the value of the variable D is null. In other words, it is determined whether or not the value corresponding to the vector key v in the above-described Hash table is null (at step S306). When the determined result at step S306 is No, the flow advances to step S307. At step S307, it is determined whether or not the value of the variable D is larger than the value of the distance d obtained at step S301. When the determined result at step S307 is No, the learning process is completed.

On the other hand, when the determined result at step S306 or step S307 is Yes, the value of the distance d obtained at step S301 is substituted into the variable D (at step S308).

Thereafter, with reference to the above-described Hash table, the value corresponding to the vector key v is updated with the current value of the variable D (at step S309). Thereafter, the learning process is completed.

In such a manner, the cognitive distance module 32 performs the learning process.

In the problem solver 30 shown in FIG. 6B, the above-described learning process is executed in combination with the cognitive distance module 32 and the state-action buffer 35.

In other words, in the learning process, a vector goal (state+action) that represents a goal state is input from the state space 34 to the cognitive distance module 32. The vector goal(state+action) is treated as the above-described t vector. On the other hand, a current state s(t) and a moving action a(t+1) that has been actually executed in the state s are input to the state-action buffer 35. As a result, an f vector is generated and input to the cognitive distance module 32. In addition, the past records of the state-action buffer 35 are referenced for the f vector. When the f vector has been stored in the state-action buffer 35, it is determined whether or not the distance in the Hash table is larger than the distance d. The Hash table is updated so that the data of the f vector in the Hash table is substituted with the value of the shorter distance of the determined result. At that point, the size (storage capacity) of the Hash table is designated corresponding to the size of the state-action buffer 35.

Figure 12:
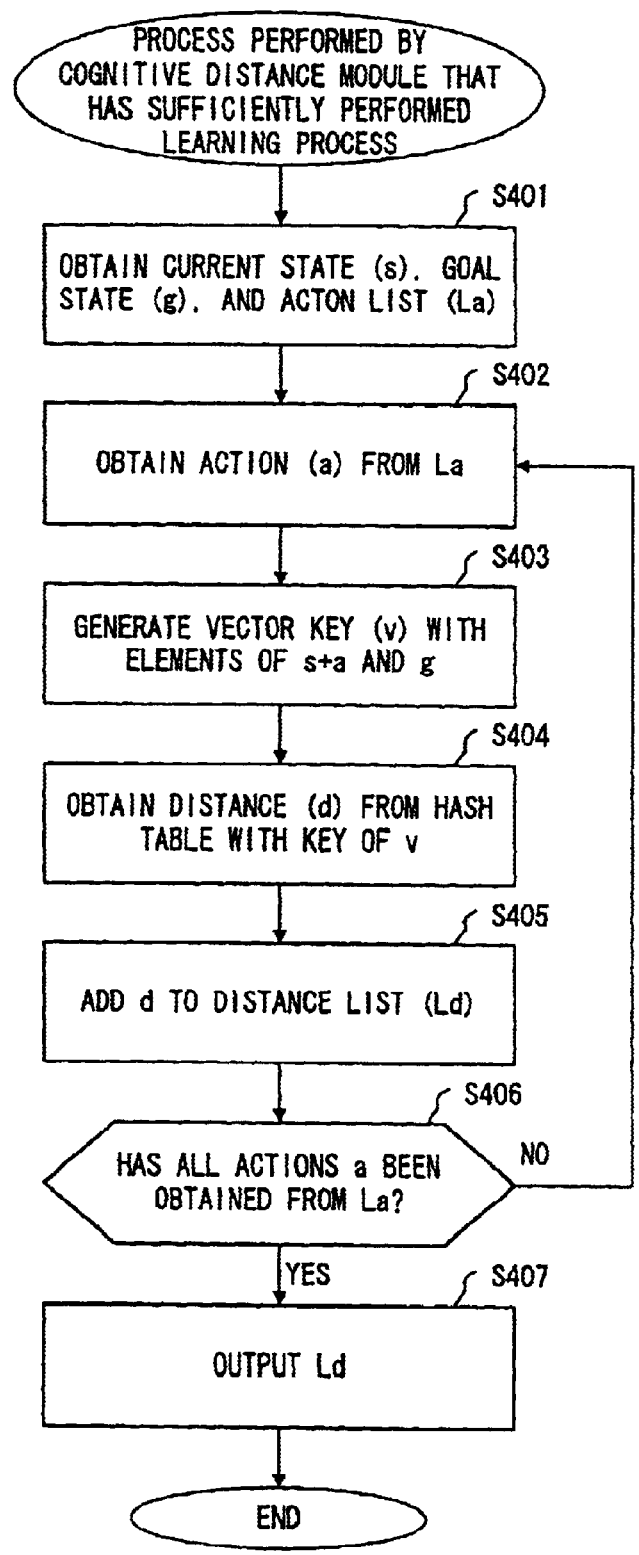
FIG. 12 is a flow chart showing a process performed by the cognitive distance module that has sufficiently performed the learning process.

FIG. 12 is a flow chart showing a process performed by the cognitive distance module 32 shown in FIG. 6B after it has sufficiently performed the learning process.

First of all, a current state s and a vector goal(state+action) (abbreviated by g vector) that represents a goal state are obtained form the state space 34. In addition, the above-described action list La is obtained form the action model generating unit 31 (at step S401).

Thereafter, one action a that can be executed in the current state s is obtained from the action list La (at step S402).

Thereafter, a vector key v that is Hash code is generated with a vector of a state s and an action a and a g vector so as to reference the Hash table stored in the cognitive distance module 32 used in the above-described learning process (at step S403). A distance d is obtained from the Hash table with a key of the vector key v (at step S404) Thereafter, the distance d obtained at step S404 is added to the above-described distance list Ld that is output information of the cognitive distance module 32 (at step S405).

Thereafter, it is determined whether or not the loop from step S403 to step S405 has been performed for all actions a contained in the action list La (at step S406). When the determined result at step S406 is No, the flow returns to step S402. At step S402, the above-described process is repeated.

On the other hand, when the determined result at step S406 is Yes, the distance list Ld is output to the selector 23 (at step S407). Thereafter, the process is completed.

As described above, after having sufficiently performed the learning process, the cognitive distance module 32 can quickly generate and output the distance list Ld corresponding to the current state s.

In the following description, the problem solver 30 shown in FIG. 6B is referred to as problem solver according to the first embodiment.

Figure 13:
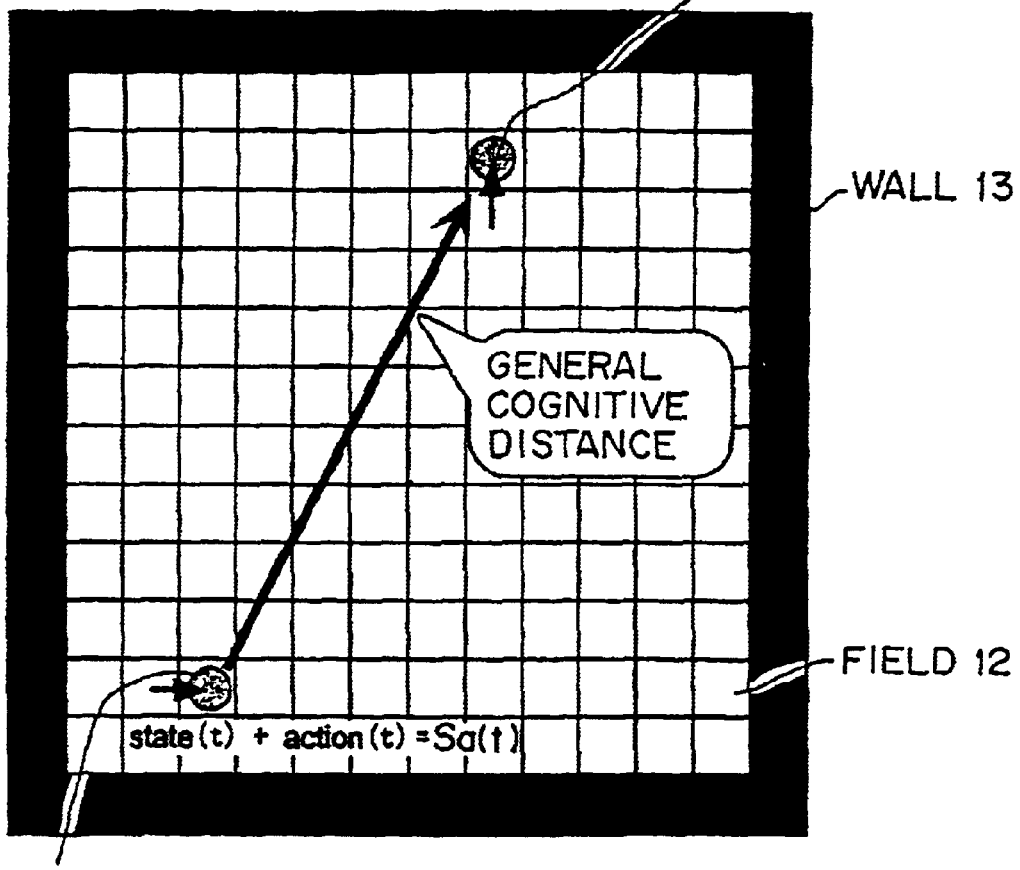
FIG. 13 is a schematic diagram showing the case that the definition of a general state is applied to the problem shown in FIG. 5.

In the problem solver according to the first embodiment, a state in a state space defined by a problem and an action executed therein are distinguished. However, in the following description, a state and an action executed therein are not distinguished, but treated as one state. As shown in FIG. 13, a general state Sa(t) of which a state s(t) at time t and an action a(t) at time t (the action a(t) is executed for obtaining the state s(t)) is defined. A problem solver based on a general cognitive distance corresponding to the general state is described as a second embodiment.

Figure 14:
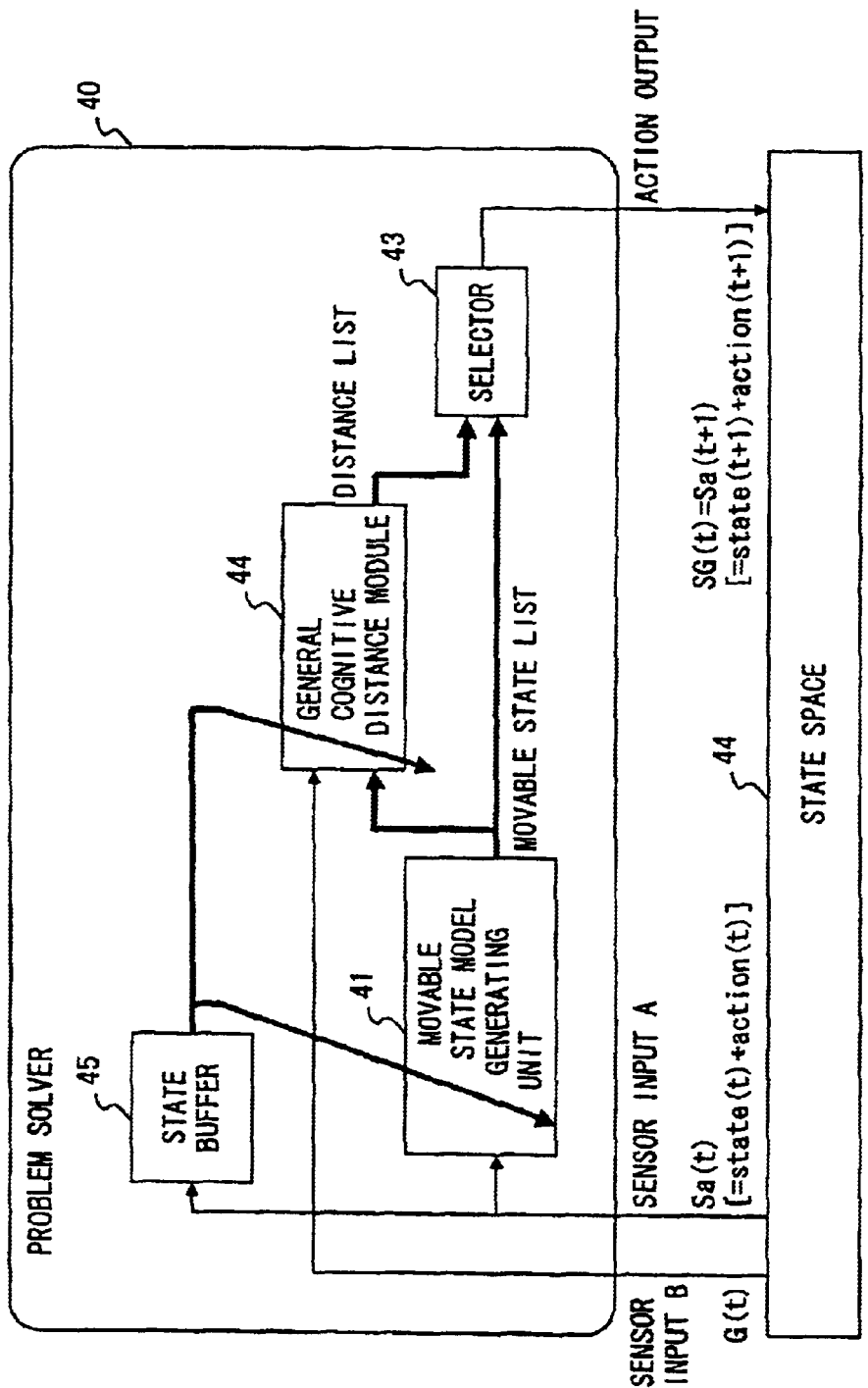
FIG. 14 is a schematic diagram showing the structure of a problem solver based on a general cognitive distance.
Figure 15:
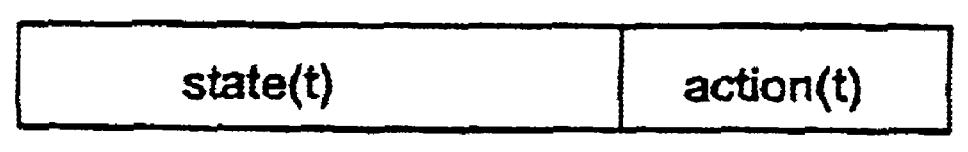

FIG. 14 shows the structure of the problem solver based on a general cognitive distance. In the structure of the problem solver according to the second embodiment, as shown in FIG. 15, a vector of a current state s(t) and an action a(t) that is executed for obtaining the state s(t) is handled.

A problem solver 40 shown in FIG. 14 comprises a movable state model generating unit 41, a general cognitive distance module 42, a selector 43, and a state buffer 45. The problem solver 40 repeats a trial for inputting a current general state Sa(t) [=s(t)+a(t)] and a general goal state G(t). As the problem solver 40 sufficiently repeats the trial, it can quickly output a sub goal SG(t)=Sa(t+1) [=s(t+1)+a(t+1)] as a general state containing an element that represents an adequate action that can be executed as the next action corresponding to a current general state Sa(t) and a goal state G(t) that should be obtained.

The state buffer 45 stores the past records of general states Sa(t) that have been input to the problem solver 40. In other words, the state buffer 45 stores past records of actions a(t) by which states a(t) are obtained. The structure and function of the state buffer 45 are the same as those of the state-action buffer 35 shown in FIG. 6B.

Figure 1:
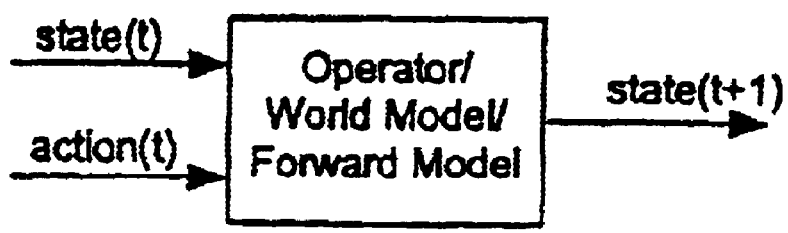
FIG. 1 is a schematic diagram for explaining an operator (action) and a world model (forward model)
Figure 2:
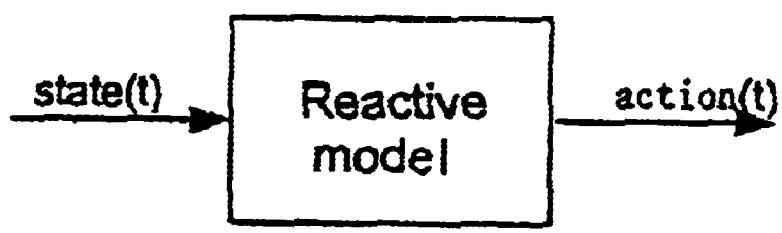
FIG. 2 is a schematic diagram for explaining a reactive planning method.
Figure 3:
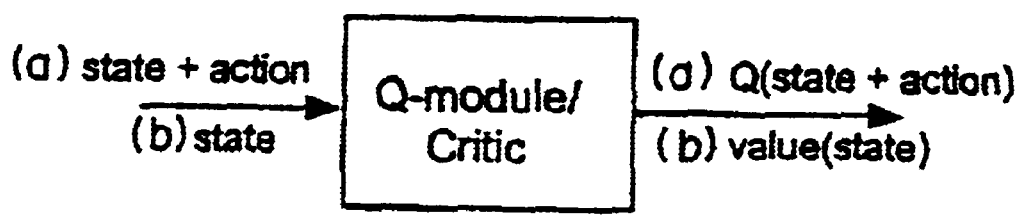
FIG. 3 is a schematic diagram for explaining a reinforcement learning method (a Q-learning method and an actor-critic model)

The movable state model generating unit 41 generates and outputs a list of general states to which a current general state Sa(t) can be directly changed (this list is referred to as movable state list). Thus, the movable state model generating unit 41 can be considered as a module of which the conventional world model (forward model) shown in FIG. 1 is applied to a framework of a general state. The movable state model generating unit 41 references the past records of the state buffer 45 and stores past records of movements that have been performed. As a result, the movable state model generating unit 41 can generate the movable state list.

Figure 16:
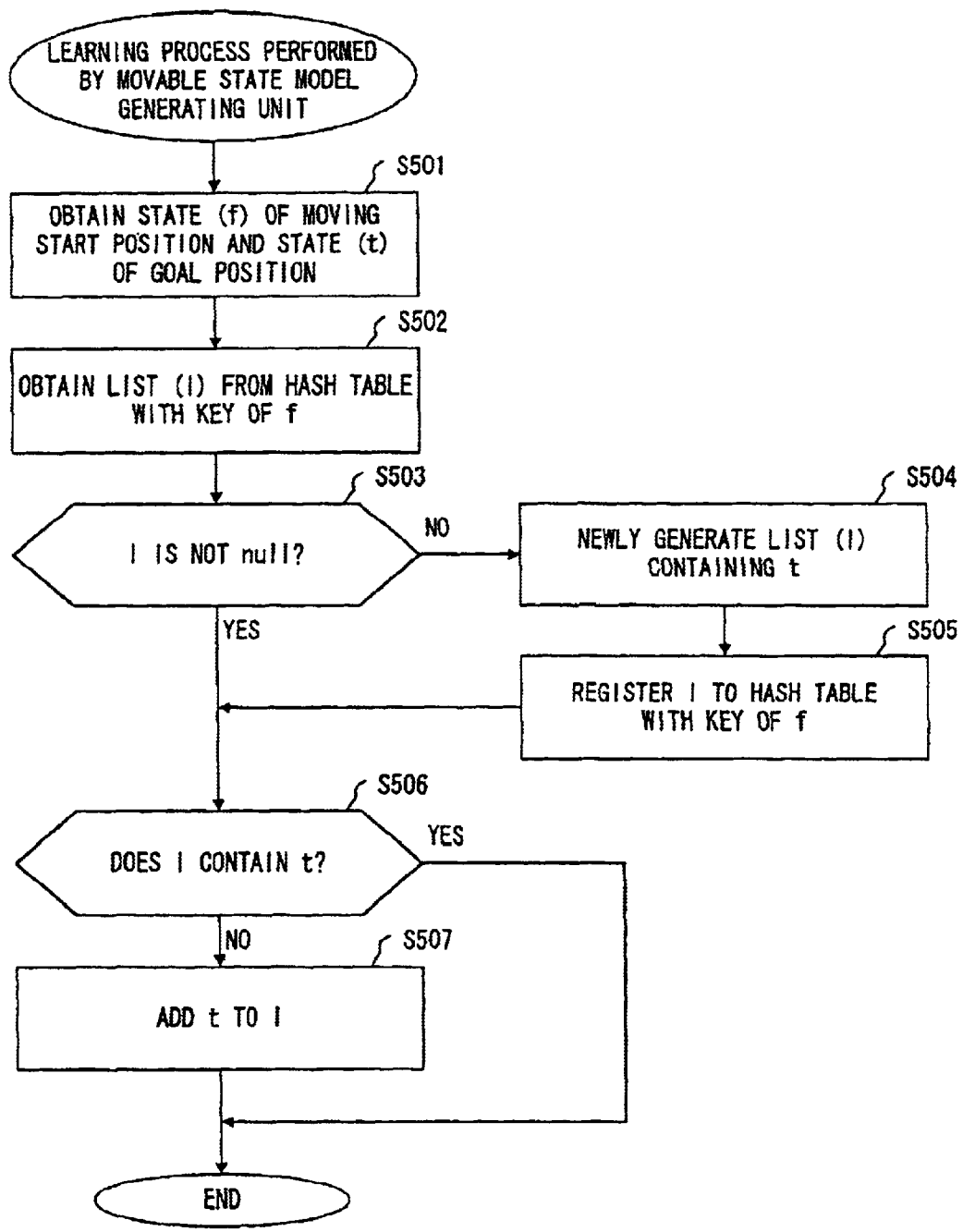
FIG. 16 is a flow chart showing a learning process performed by a movable state model generating unit.

FIG. 16 is a flow chart showing a learning process performed by the movable state model generating unit 41. In the learning process, when it becomes clear that an action from a from vector (abbreviated as f vector) that represents a general state in a state space 44 to a to vector (abbreviated as t vector) can be directly performed, past records are stored.

First of all, an f vector and a t vector are obtained (at step S501). At that point, a list 1 is obtained from a Hash table stored in the movable state model generating unit 41 with a key of the f vector (the list 1 contains vectors representing states that can be directly moved from the f vector corresponding to the past records) (at step S502).

Thereafter, it is determined whether or not the list 1 is null (namely, the list 1 is contained in the Hash table) (at step S503). Only when the determined result at step S503 is No, the list 1 containing a t vector is generated (at step S504). The generated list 1 is registered to the Hash table so that the t vector correlates with a key of the f vector (at step S505).

Thereafter, it is determined whether or not the list 1 contains a t vector (at step S506). Only when the determined result at step S506 is No, a t vector is added to the list 1 (at step S507).

In such a manner, the movable state model generating unit 41 performs the learning process.

In FIG. 14, a current general state Sa(t) is input from a state space 44 to the movable state model generating unit 41. The general state Sa(t) is treated as a t vector in the above-described learning process. The just preceding state Sa(t−1) of the general state Sa(t) is input from the state buffer 45. The state Sa(t−1) is treated as an f vector in the learning process. After having sufficiently performed the learning process, the movable state model generating unit 41 obtains a list 1 from the above-described Hash table with a key of the general state Sa(t) that is input from the state space 44 and immediately outputs the list 1 as a movable state list to the selector 43.

The general cognitive distance module 42 calculates the distance (general cognitive distance) from a vector of each generate state to a vector of a general goal state G(t) corresponding to each general state contained in a movable state list that is output from the movable state model generating unit 41 and the general goal state G(t) in the state space 44 that is input to a sensor input B and outputs the results as a distance list. The structure and function of the general cognitive distance module 42 are the same as those of the cognitive distance module 32 shown in FIG. 6B. Likewise, the general cognitive distance module 42 stores a distance table. In addition, the general cognitive distance module 42 updates the distance table corresponding to the state buffer 45.

The selector 43 selects a general state from the movable state list that is output from the movable state model generating unit 41 corresponding to the distance list that is output from the general cognitive distance module 42 so that the cognitive distance becomes the shortest. The selector 43 outputs the selected result as a sub goal SG(t). The structure and function of the selector 43 are the same as those of the selector 33 shown in FIG. 6B.

In the above-described structure, the problem solver 40 can quickly output an optimum sub goal SG(t) for a goal state from a particular general state Sa(t) through the learning process.

Next, a third embodiment of the present invention will be described.

Since the problem solvers according to the first and second embodiments of the present invention are based on the cognitive distance (or general cognitive distance), a storage capacity for a large amount of information is required. Thus, there are two problems that follow.

(1) Large Number of Combinations of Cognitive Distances

When the number of general states in a state space defined by a problem is denoted by Ns, the number of combinations of cognitive distances become O(Ns×Ns). In other words, the number of combinations is proportional to the square of the number of states. Thus, when a large state space is defined by a problem, it is not practical to store information of all cognitive distances.

When the average of the number of directly movable states is denoted by m, the storage capacity of the total of actions of the conventional GPS is at most O(Nx×m). In addition, the storage capacity of the total of actions of the reinforcement learning method is around O(Ns).

(2) Problem Due to Limitation of Storage Amount for Cognitive Distances

To solve the problem (1), the number of cognitive distances may be limited to maximum value θ. In this case, the above-described storage capacity can be reduced to around O(Ns×m$^θ$). In addition, the number of records of general states of the state buffer 45 (see FIG. 14) can be suppressed to around θ. Moreover, the number of calculations necessary for the update process for the cognitive distances can be effectively suppressed. However, in this method, an action cannot be decided when the number of states exceeds the maximum value.

Figure 17:
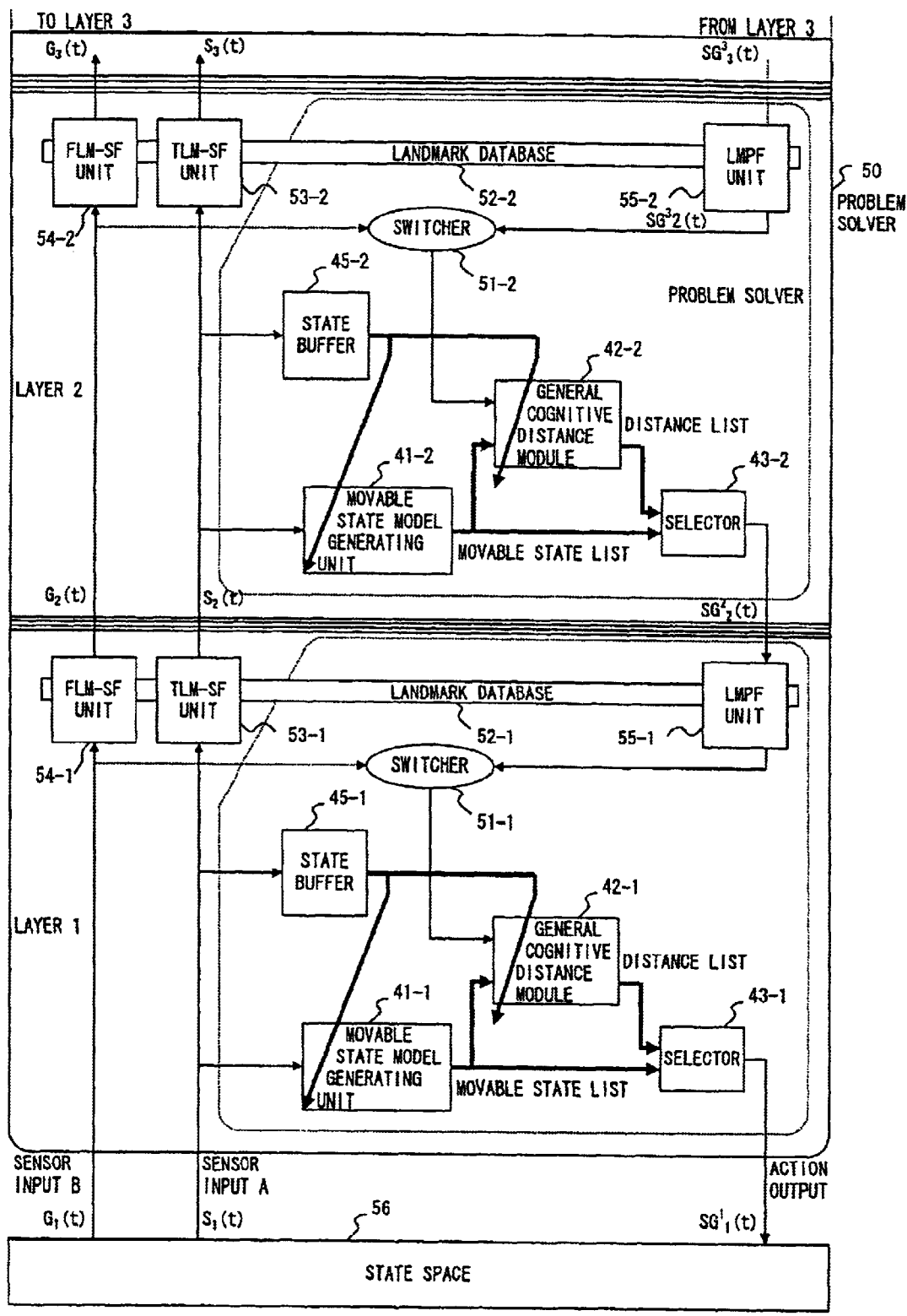
FIG. 17 is a schematic diagram showing the structure of a hierarchical problem solver based on the general cognitive distance.

To solve the above-described problem, according to the third embodiment of the present invention, a problem solver using general states is hierarchically structured. FIG. 17 shows the structure of the problem solver based on hierarchical general cognitive distances. FIG. 17 shows the structure for only a layer 1 and a layer 2 of a problem solver 50. The structure of each of other layers is the same as the structure of each of the layer 1 and the layer 2. In other words, the structure of each layer of the problem solver 50 is the same. Thus, the other layers are omitted in FIG. 17.

The problem solver 50 shown in FIG. 17 is composed of a plurality of problem solvers 40 shown in FIG. 14.

Figure 18:
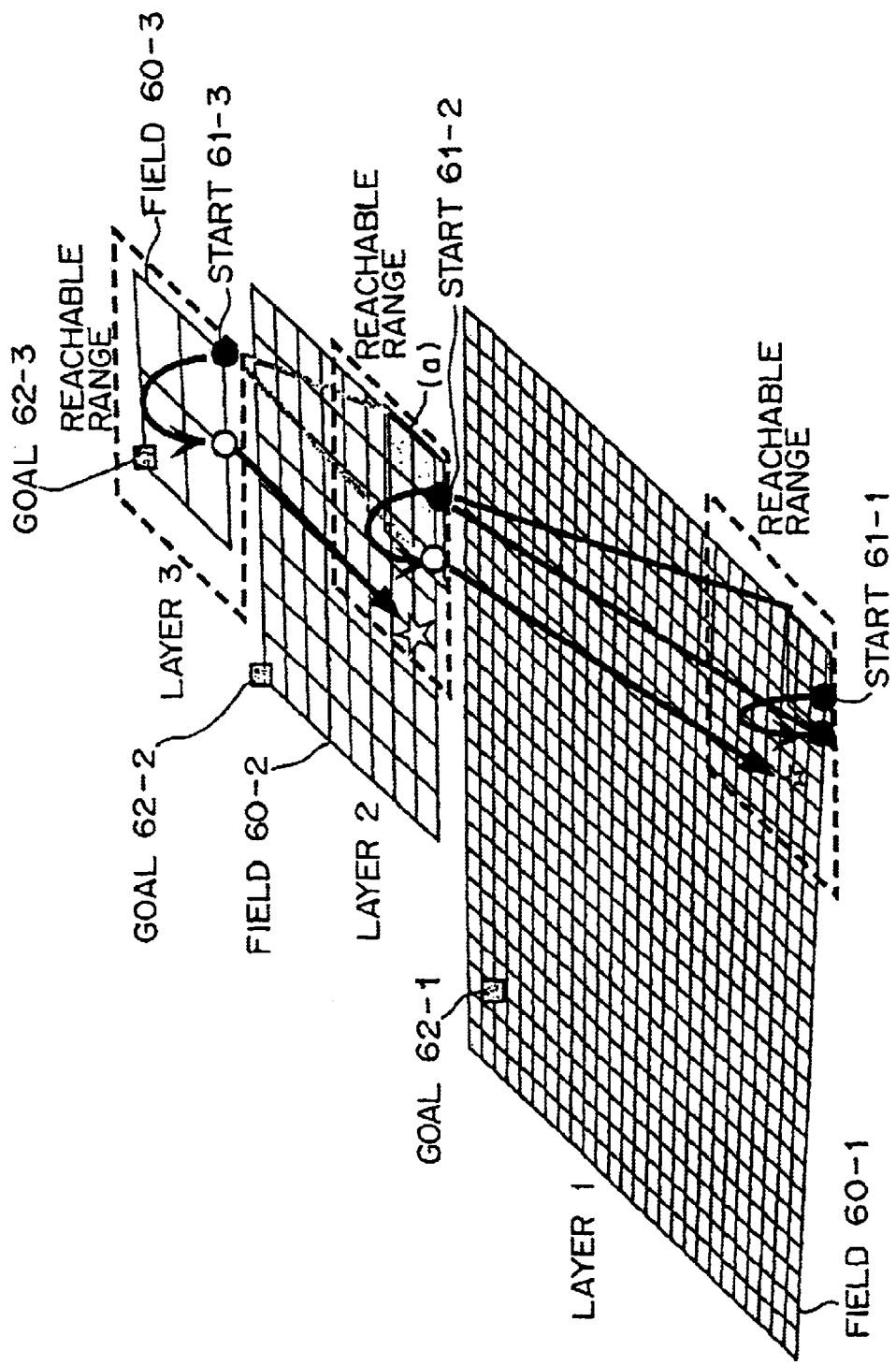
FIG. 18 is a schematic diagram for explaining a hierarchy of a state space represented in a general state.

Next, with reference to FIG. 18, the hierarchy of a state space represented with general states will be described. FIG. 18 shows the structure of three layer (hierarchical layers).

First, a function representing the correlation from a lower layer to an upper layer is defined. In addition, a function for obtaining a landmark of a lower layer from an upper layer is defined. In this case, a landmark is one state that represents at least one state of a lower layer corresponding to a state of an upper layer.

In this example, the former function and the latter function are referred to as segmentation function and landmark position function, respectively.

In FIG. 18, the segmentation function causes a range (a) in a field 60-2 on the layer 2 to be concentrated to a position (state) represented as a start 61-3 in a field 60-3 on the layer 3. On the other hand, the landmark position function causes a white circle mark in a field 60-3 on the layer 3 to be mapped to a star mark position (landmark) in the field 60-2 on the layer 2.

To allow the reader of this document to easily understand the relation among layers, the following two properties are defined.

(1) Direct Changeability

This property represents that a current state can be directly changed to a goal state. In other words, this property represents that a state can be changed using only a layer lower than a current layer.

(2) Reachability

This property represents that a current state can be reached to a goal state through actions (regardless of the number of actions). In FIG. 18, reachable ranges from individual start positions (61-1, 61-2, and 61-3) in fields (60-1, 60-2, and 60-3) on the individual layers are denoted by dotted frames.

When two particular layers are considered, on the lower layer, the problem solver can obtain knowledge about a movement between two close states, not about a movement from a current state to a far goal state. On the upper layer, the problem solver can obtain knowledge about a course movement from a current state to a far goal state, not about a precise movement. In other words, when the problem solver is hierarchically structured, the reachability of a lower layer can be substituted with the direct changeability of the upper layer.

For example, in FIG. 18, the start 61-3 and the white circle mark that are apart by one grid (namely, they are directly changeable) in the field 60-3 on the layer 3 are substituted with the start 61-2 and the star mark on the layer 2, respectively. The start 61-2 and the star mark are positioned in the reachable range. In other words, the problem solver can calculate the cognitive distance on the layer 2. Thus, the problem solver can generate an action sequence.

Next, a problem for obtaining a route from a start to a goal in a general state space will be considered using a hierarchy. In other words, in FIG. 18, a problem for obtaining a route from the start 61-1 to a goal 62-1 will be considered.

In the field 60-1, the goal 62-1 is positioned outside the reachable range of the start 61-1. In other words, the problem solver cannot calculate the cognitive distance on the layer 1. Thus, the problem solver cannot generate an action sequence on the layer 1.

Thus, using the segmentation function, the start 61-1 and the goal 62-1 are concentrated to the start 61-2 and a goal 62-2 in the field 60-2 on the layer 2, respectively. However, on the layer 2, the goal 62-2 is positioned outside the reachable range of the start 61-2.

Thus, the segmentation function is further used. The start 61-2 and the goal 62-2 are concentrated to the start 61-3 and the goal 62-3 in the field 60-3 on the layer 3, respectively. On the layer 3, the goal 62-3 is positioned inside the reachable range of the start 61-3. Thus, the problem solver decides a real state movement and outputs a sub goal on the layer 3. Thereafter, using the landmark position function, the sub goal is mapped and thereby a landmark is obtained. The landmark is returned to the layer 2.

The problem solver decides a real state movement from the start 61-2 to the landmark on the second layer and outputs a sub goal. Thereafter, using the landmark position function, the sub goal is mapped and thereby a landmark is obtained. The landmark is returned to the layer 1.

The problem solver on the layer 1 decides a real state movement from the start 61-1 to the returned landmark and outputs a sub goal. Thereafter, the problem solver obtains a route from the sub goal to the goal 62-1.

When such a process is repeated on each layer, the final route from the start 61-1 to the goal 62-1 can be obtained.

Next, the structure of the problem solver 50 shown in FIG. 17 will be described.

In the problem solver 50, the structures of movable state model generating units (41-1 and 41-2), general cognitive distance modules (42-1 and 42-2), selectors (43-1 and 43-2), and state buffers (45-1 and 45-2) are the same as those of respective structural units of the problem solver 40 shown in FIG. 14.

A switcher (51-1, 51-2) selects a goal obtained from a lower layer (or a state space 56) or a landmark of a sub goal returned from an upper layer. The switcher (51-1, 51-2) selects a goal obtained from the lower layer with high priority and causes the general cognitive distance module (42-1, 42-2) to try to generate a general cognitive distance. When the general cognitive distance module has failed to generate a general cognitive distance, the switcher (51-1, 51-2) selects a landmark of a sub goal returned from the upper layer and causes the general cognitive distance module (42-1, 42-2) to try to generate a general cognitive distance.

A landmark database (52-1, 52-2) is a database that stores general state relation information of a current layer and an adjacent upper layer. The landmark database composes the above-described segmentation function and landmark position function.

According to the present invention, two types of information converting units are disposed. The first information converting units are TLM-SF (To Landmark Segmentation Function) units (53-1 and 53-2). The second information converting units are FLM-SF (From Landmark Segmentation Function) units (54-1 and 54-2).

When the TLM-SF unit (53-1, 53-2) inputs information that represents a general state of a lower layer, the TLM-SF unit (53-1, 53-2) outputs ID data (identification data) for a general state of an upper layer, the general state on the upper layer concentrating a range reachable from the general state of the lower layer, corresponding to relation information stored in the landmark database (52-1, 52-2). Thus, the TLM-SF unit (53-1, 53-2) performs a conversion for information representing a current general state.

When the FLM-SF unit (54-1, 54-2) inputs information that represents a general state of a lower layer, the FLM-SF unit (54-1, 54-2) outputs ID data for a general state of an upper layer, the general state on the upper layer concentrating a range reachable to the general state of the lower layer, corresponding to relation information stored in the landmark database (52-1, 52-2). Thus, the FLM-SF unit (54-1, 54-2)

performs a conversion for information representing a general state as a goal.

The LMPF (Landmark Position Function) unit (55-1, 55-2) performs a conversion for information corresponding to the landmark position function. When the LMPF unit (55-1, 55-2) inputs information that represents a general state on an upper layer, the LMPF unit (55-1, 55-2) outputs a general state of a landmark that represents a reachable range on the lower layer corresponding to the general state on the upper layer. Thus, the LMPF unit (55-1, 55-2) performs a conversion for information representing a general state of a sub goal returned from an upper layer.

Since the problem solver 50 comprises such structural units, it can decide an action between states that are far apart.

As shown in FIG. 18, in the problem solver using hierarchical general states, most of the storage capacity thereof is used for information of cognitive distances on the lowest layer. When the average of the number of states to which a particular state on the lowest layer is directly changeable is denoted by m and the upper limit of the number of cognitive distances that can be stored is denoted by $\theta$, the storage capacity for the information of the cognitive distances is on the order of $O(Ns \times (m^\theta))$. Thus, according to the third embodiment, while the stored data amount of learnt results for cognitive distances is limited, an action between states that are far apart can be decided.

A control program that directs a computer to execute a generation process for an action sequence performed by each of the problem solvers according to the first, second, and third embodiments may be created and stored to a computer-readable storage medium. At that point, the program can be read from the storage medium and executed by the computer.

Figure 19:
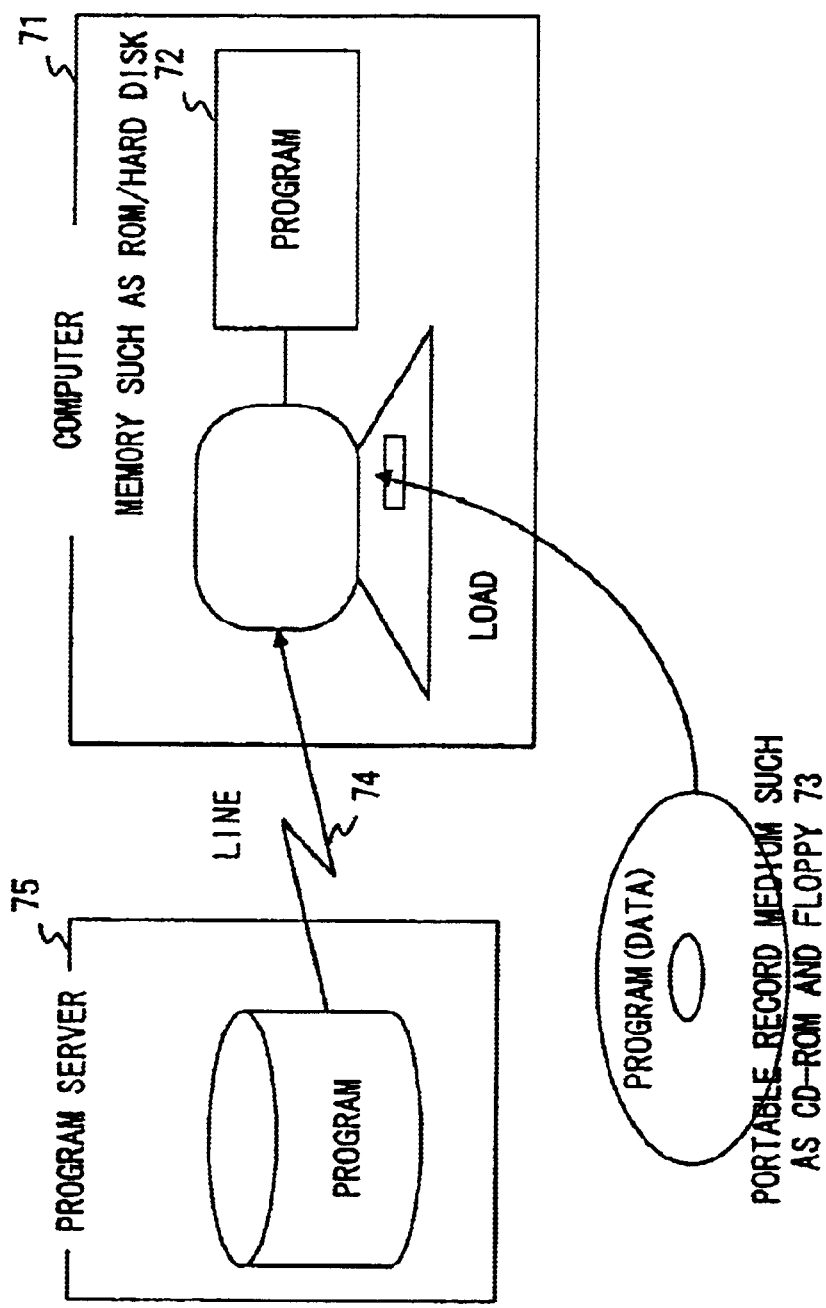
FIG. 19 is a schematic diagram showing an example of a storage medium from which a control program can be read by a computer.

FIG. 19 shows a storage medium from which a computer can read a control program. As shown in FIG. 19, examples of the storage medium are a memory 72 (such as a ROM device and a hard disk device as internal or external devices of the computer 71) and a portable record medium (such as a floppy disk, an MO (magneto-optical disc), a CD-ROM, and a DVD-ROM). Alternatively, the storage medium may be a storage device 76 of a program server 75 as a computer connected to the computer 71 through a line 74. In this case, a transmission signal of which a data signal of the control program has been modulated with a carrier wave may be transmitted from the program server 75 through the line 74. In this case, the computer 71 demodulates the received transmission signal and reproduces the control program. As a result, the control program can be executed.

As was described above, according to the present invention, when an initial state and a goal state are designated in a state space defined by a particular problem, a problem solver that generates an action sequence executed from the initial state to the goal state learns a cognitive distance that represents a cost of the execution of the action sequence from any state to the goal state in the state space. Corresponding to the learnt result of the cognitive distance, the problem solver decides the next action that should be executed in a particular state of the state space so as to obtain the goal state. Alternatively, the problem solver executes the next action so as to decide the next state as the goal state.

Thus, according to the present invention, the calculation cost of the execution of an action can be suppressed. In addition, the flexibility against a change of a goal state can be secured.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A problem solver for generating an action sequence executed from an initial state to a goal state in a state space defined by a particular problem, comprising:

a cognitive distance learning unit learning a cognitive distance that represents a cost acted on the environment of the state space, the cost being spent in an action sequence executed from a first state in the state space to a second state that is different from the first state; and a next action deciding unit deciding a next action contained in the action sequence that has to be executed in a particular state to attain the goal state in the state space based on the cognitive distance learnt by said cognitive distance learning unit.

2. The problem solver as set forth in claim 1, further comprising:

an action presenting unit presenting next actions that are executable in any state of the state space, wherein said next action deciding unit selects one from the next actions presented by said action presenting unit so that the cognitive distance from a state reached as the result of the execution of the selected action to the goal state becomes short.

3. The problem solver as set forth in claim 1, wherein said cognitive distance learning unit stores the cognitive distance as the learnt result, wherein said next action deciding unit decides the next action based on the cognitive distance learnt by and stored in said cognitive distance learning unit, and wherein said cognitive distance learning unit updates a stored cognitive distance when said cognitive distance learning unit has re-learnt it.

4. A problem solver for generating an action sequence executed from an initial state to a goal state in a state space defined by a particular problem, comprising:

a cognitive distance learning unit learning a cognitive distance that represents a cost acted on the environment of the state space, the cost being spent in an action sequence executed from a first state in the state space to a second state that is different from the first state; and a next state deciding unit deciding a next state reachable in the execution of a particular action contained in the action sequence based on the cognitive distance learnt by said cognitive distance learning unit, the particular action having to be executed in a particular state to attain the goal state in the state space.

5. The problem solver as set forth in claim 4, further comprising:

a state presenting unit presenting states reachable in the execution of next actions that are executable in any state of the state space, wherein said next state deciding unit selects one from the next states presented by said state presenting unit so that the cognitive distance to the goal state becomes short.

6. The problem solver as set forth in claim 4, wherein said cognitive distance learning unit stores the cognitive distance as the learnt result, wherein said next state deciding unit decides the next state based on the cognitive distance learnt by and stored in said cognitive distance learning unit, and wherein said cognitive distance learning unit updates a stored cognitive distance when said cognitive distance learning unit has re-learnt it.

7. The problem solver as set forth in claim 4, further comprising:

a segmentation unit correlating a range of a state in the state space, the cognitive distance of the state being learnable by said cognitive distance learning unit, with one state on an upper hierarchical layer in the state space;

a landmark correlating unit correlating a state on the upper hierarchical layer in the state space with a landmark on a lower hierarchical layer in the state space, the landmark being a state representing the range on the lower hierarchical layer;

an upper hierarchical layer cognitive distance learning unit learning the cognitive distance from a first state to a second state that is different from the first state on the upper hierarchical layer; and an upper hierarchical layer next state deciding unit deciding a next state reachable in the execution of a particular action having to be executed in a particular state on the upper hierarchical layer in the state space, the next state being to attain a goal state on the upper hierarchical layer in the state space, based on the cognitive distance on the upper hierarchical layer in the state space, the cognitive distance being learnt by said upper hierarchical layer cognitive distance learning unit, the particular state on the lower hierarchical layer being correlated with the particular state on the upper hierarchical layer by said segmentation unit, wherein said cognitive distance learning unit learns the cognitive distance on the lower hierarchical layer in the state space, and wherein said next state deciding unit decides a next state reachable in the execution of a next action that has to be executed in a particular state on the lower hierarchical layer in the state space, the next state being to attain a landmark correlated with a next state on the upper hierarchical layer in the state space by said landmark correlating unit, based on the cognitive distance on the lower hierarchical layer in the state space, the cognitive distance being learnt by said cognitive distance learning unit.

8. A problem solver for generating an action sequence executed from an initial state to a goal state in a state space defined by a particular problem, comprising:

cognitive distance learning means for learning a cognitive distance that represents a cost acted on the environment of the state space, the cost being spent in an action sequence executed from a first state in the state space to a second state that is different from the first state; and next action deciding means for deciding a next action contained in the action sequence that has to be executed in a particular state to attain the goal state in the state space based on the cognitive distance learnt by said cognitive distance learning means.

9. A problem solver for generating an action sequence executed from an initial state to a goal state in a state space defined by a particular problem, comprising:

cognitive distance learning means for learning a cognitive distance that represents a cost acted on the environment of the state space, the cost being spent in an action sequence executed from a first state in the state space to a second state that is different from the first state; and next state deciding means for deciding a next state reachable in the execution of a particular action contained in the action sequence based on the cognitive distance learnt by said cognitive distance learning means, the particular action having to be executed in a particular state to attain the goal state in the state space.

10. A computer-readable storage medium storing a control program used to direct a computer to generate an action sequence executed from an initial state to a goal state in a state space defined by a particular problem, the control program stored in the storage medium comprising the operations of:

directing the computer to learn a cognitive distance that represents a cost acted on the environment of the state space, the cost being spent in an action sequence executed from a first state in the state space to a second state that is different from the first state; and directing the computer to decide a next action contained in the action sequence that has to be executed in a particular state to attain the goal state of the state space based on the learnt result of the cognitive distance.

11. A computer-readable storage medium storing a control program used to direct a computer to generate an action sequence executed from an initial state to a goal state in a state space defined by a particular problem, the control program stored in the storage medium comprising the operations of:

directing the computer to learn a cognitive distance that represents a cost acted on the environment of the state space, the cost being spent in an action sequence executed from a first state in the state space to a second state that is different from the first state; and directing the computer to decide a next state reachable in the execution of a particular action contained in the action sequence based on the learnt result of the cognitive distance, the particular action having to be executed in a particular state to attain the goal state in the state space.

12. A computer data signal embodied in a carrier wave and representing a control program used to direct a computer to generate an action sequence executed from an initial state to a goal state in a state space defined by a particular problem, the control program comprising the operations of:

directing the computer to learn a cognitive distance that represents a cost acted on the environment of the state space, the cost being spent in an action sequence executed from a first state in the state space to a second state that is different from the first state; and directing the computer to decide a next action contained in the action sequence that has to be executed in a particular state to attain the goal state of the state space based on the learnt result of the cognitive distance.

13. A computer data signal embodied in a carrier wave and representing a control program used to direct a computer to generate an action sequence executed from an initial state to a goal state in a state space defined by a particular problem, the control program comprising the operations of:

directing the computer to learn a cognitive distance that represents a cost acted on the environment of the state space, the cost being spent in an action sequence executed from a first state in the state space to a second state that is different from the first state; and directing the computer to decide a next state reachable in the execution of a particular action contained in the action sequence based on the learnt result of the cognitive distance, the particular action having to be executed in a particular state to attain the goal state in the state space.

* * * * *